(12) United States Patent
Sun et al.

(10) Patent No.: US 9,543,867 B2
(45) Date of Patent: Jan. 10, 2017

(54) BRUSHLESS DIRECT CURRENT MOTOR AND DRIVING APPARATUS THEREOF

(71) Applicant: Robert Bosch GmbH, Stuttgart (DE)

(72) Inventors: Yi Sun, Shanghai (CN); Kevin Zhang, Shanghai (CN); Tina Shen, Shanghai (CN); Chaoqun Xu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/970,673

(22) Filed: Dec. 16, 2015

(65) Prior Publication Data

US 2016/0181957 A1    Jun. 23, 2016

(30) Foreign Application Priority Data

Dec. 17, 2014    (CN) .......................... 2014 1 0788481

(51) Int. Cl.
*H02P 6/18*        (2016.01)
(52) U.S. Cl.
CPC ..................................... *H02P 6/182* (2013.01)
(58) Field of Classification Search
CPC ................. H02P 6/00; H02P 6/16; H02P 6/18; H02P 27/04; H02P 23/00; H02P 25/00; H02P 27/00; H02P 3/00; H02P 3/18
USPC .......................... 318/400.01, 400.14, 400.15, 400.32, 318/400.34, 400.35, 700, 701, 721, 727, 799, 318/800, 801, 430, 432, 599, 811; 388/800, 388/909, 928.1
See application file for complete search history.

(56) References Cited

U.S. PATENT DOCUMENTS

| 8,415,908 | B2* | 4/2013 | Galbiati | H02P 6/085 |
| | | | | 318/400.2 |
| 9,071,181 | B2* | 6/2015 | Yersin | H02P 6/182 |
| 2014/0167667 | A1* | 6/2014 | Ko | H02P 6/182 |
| | | | | 318/400.35 |
| 2014/0176032 | A1 | 6/2014 | Lee | |
| 2014/0265990 | A1 | 9/2014 | Chretien et al. | |
| 2016/0238432 | A1* | 8/2016 | Starinki | G01F 25/00 |

FOREIGN PATENT DOCUMENTS

DE    10 2010 009 662 A1    9/2011

* cited by examiner

*Primary Examiner* — Antony M Paul
(74) *Attorney, Agent, or Firm* — Maginot, Moore & Beck LLP (57) ABSTRACT

The present invention relates to driving apparatus for a brushless direct current motor, comprising: at least three half-bridge circuits, each having two switches connected in series and being configured to supply a voltage to a terminal of a rotor coil; a zero crossing detection module configured to detect whether the rotor coils experience BEMF zero crossing and provide a control module with an indication signal that indicates whether the rotor coils experience BEMF zero crossing, based on a type of the brushless direct current motor; and a control module configured to transmit to the zero crossing detection module information regarding the type of the brushless direct current motor, and generate and output, based on the indication signal, pulse width modulation signals to control the switches of the half-bridge circuits. The driving apparatus may drive a plurality of types of brushless direct current motors.

6 Claims, 5 Drawing Sheets

BRUSHLESS DIRECT CURRENT MOTOR AND DRIVING APPARATUS THEREOF

This application claims priority under 35 U.S.C. §119 to patent application no. CN 201410788481.7 filed on Dec. 17, 2014 in China, the disclosure of which is incorporated herein by reference in its entirety.

TECHNICAL FIELD

The present invention relates to a direct current motor, and in particular, to a brushless direct current motor and driving apparatus thereof.

BACKGROUND

A brushless direct current motor is a type of direct current motor. Since the brushless direct current motor has high power density, high efficiency, compact structure, low maintenance cost and easy control, it has been used widely in industry field.

The brushless direct current motor includes a stator and a rotor on which a coil is wound. According to a different number of coils wound on the rotor, there are three types of brushless direct current motors, i.e., a 1H bridge brushless direct current motor, a 2H bridge brushless direct current motor and a three-phase brushless direct current motor. The rotor of the 1H bridge brushless direct current motor has only one coil, each terminal of which is powered by a half-bridge circuit composed of two power switching devices connected in series, wherein the coil and two half-bridge circuits for supplying power to the two terminals of the coil form one "H" configuration, and thus the 1H bridge brushless direct current motor obtains its name. The rotor of the 2H bridge brushless direct current motor has two coils, and each terminal of each coil is powered by a half-bridge circuit composed of two power switching devices connected in series, wherein the two coils and four half-bridge circuits for supplying power to respective terminals of the two coils form two "H" configurations, and thus the 2H bridge brushless direct current motor obtains its name. The rotor of the three-phase brushless direct current motor includes three phase coils connected in star arrangement (also referred to as A phase coil, B phase coil and C phase coil), wherein a terminal of each of the three phase coils is connected to a common point that is referred to as a star point.

The brushless direct current motor further includes a driving apparatus for driving rotation of the rotor. At present, the driving apparatus designed for a particular type of brushless direct current motor can not drive other types of brushless direct current motors. Specifically, the driving apparatus designed for the three-phase brushless direct current motor am not drive the 1H bridge brushless direct current motor and the 2H bridge brushless direct current motor, the driving apparatus designed for the 1H bridge brushless direct current motor am not drive the three-phase brushless direct current motor and the 2H bridge brushless direct current motor, and the driving apparatus designed for the 2H bridge brushless direct current motor can not drive the 1H bridge brushless direct current motor and the three-phase brushless direct current motor.

SUMMARY

In consideration of the above defects of the prior art, embodiments of the present invention provide a driving apparatus for a brushless direct current motor, which can drive a plurality of types of brushless direct current motors.

A driving apparatus for a brushless direct current motor according to an embodiment of the present invention comprises: at least three half-bridge circuits, each of which includes two power switching devices connected in series and is configured for supplying a voltage to a terminal of one of coil(s) of rotor(s) of at least one of a plurality of types of brushless direct current motors; a zero crossing detection module; and a control module, wherein the zero crossing detection module is operable for detecting whether coils included in rotors of the plurality of types of direct current motors experience back electromotive force BEMF zero crossing, and is configured for providing, based on information on a type of a brushless direct current motor driven by the driving apparatus currently that is received from the control module, the control module with an indication signal for indicating whether coil(s) included in a rotor of the brushless direct current motor driven by the driving apparatus currently experience BEMF zero crossing, and the control module is configured for transmitting to the zero crossing detection module the information on the type of the brush less direct current motor driven by the driving apparatus currently, and generating and outputting, based on the indication signal provided by the zero crossing detection module, pulse width modulation signals for controlling the power switching devices included in the at least three half-bridge circuits.

Wherein the zero crossing detection module comprises: at least three input terminals, each of which is connectable to a terminal of one of coil(s) of rotor(s) of at least one of the plurality of types of brushless direct current motors for obtaining a voltage; at least two detecting circuits, each of which is connected to at least one of the at least three input terminals and is configured for detecting, based on voltages of two terminals of a specified coil of rotor(s) of at least one of the plurality of types of brushless direct current motors, whether the specified coil experiences BEMF zero crossing, and outputting a detecting signal for indicating whether the specified coil experiences BEMF zero crossing; and a providing module for providing, based on the information on the type of the brushless direct current motor driven by the driving apparatus currently, the control module with the detecting signal outputted by a specified detecting circuit of the at least two detecting circuits, wherein the detecting signal outputted by the specified detecting circuit is the indication signal for indicating whether the coil(s) included in the rotor of the brushless direct current motor driven by the driving apparatus currently experiences BEMF zero crossing.

Wherein the zero crossing detection module further comprises a generating circuit for generating a first reference voltage of a three-phase brushless direct current motor whose rotor has A phase coil, B phase coil and C phase coil connected in star arrangement, as a voltage of a terminal of the A phase coil, a terminal of the B phase coil and a terminal of the C phase coil that are connected together, wherein the at least three input terminals include a first input terminal, a second input terminal, a third input terminal and a fourth input terminal, wherein the at least two detecting circuits include a first detecting circuit, a second detecting circuit a third detecting circuit and a fourth detecting circuit, the first detecting circuit is configured for detecting, based on a voltage from the first input terminal and the first reference voltage, whether the A phase coil experiences BEMF zero crossing and outputting a detecting signal for indicating whether the A phase coil experiences BEMF zero crossing, or, for detecting, based on the voltage from the first input terminal and a voltage from the second input terminal, whether a first coil in a 2H bridge brushless direct current motor whose rotor has only the first coil and a second coil experiences BEMF zero crossing and outputting a detecting signal for indicating whether the first coil experiences BEMF zero crossing, the second detecting circuit is configured for detecting, based on the voltage from the second input terminal and the first reference voltage, whether the B phase coil experiences BEMF zero crossing and outputting a detecting signal for indicating whether the B phase coil experiences BEMF zero crossing, the third detecting circuit is configured for detecting, based on a voltage from the third input terminal and the first reference voltage, whether the C phase coil experiences BEMF zero crossing and outputting a detecting signal for indicating whether the C phase coil experiences BEMF zero crossing, and the fourth detecting circuit is configured for detecting, based on the voltage from the third input terminal, a voltage from the fourth input terminal and a second reference voltage, whether the second coil or a third coil in a 1H bridge brushless direct current motor whose rotor has only the third coil experiences BEMF zero crossing and outputting a detecting signal for indicating whether the second coil or the third coil experiences BEMF zero crossing.

Wherein the generating circuit generates the first reference voltage based on the voltage from the first input terminal, the voltage from the second input terminal and the voltage from the third input terminal, or, generates a ground voltage as the first reference voltage, or calculates a half of a work voltage of the driving apparatus as the first reference voltage.

Wherein the voltage from the first input terminal, the voltage from the second input terminal, the voltage from the third input terminal and the voltage from the fourth input terminal are subject to sample and hold processing.

A brushless direct current motor according to an embodiment of the present invention comprises: a stator; a rotor; and the driving apparatus mentioned above.

It can be seen from the above description that the zero crossing detection module included in the driving apparatus according to embodiments of the present invention can detect whether the coils included in the rotors of the plurality of types of brushless direct current motors experience BEMF zero crossing, so compared with the prior art, the driving apparatus according to embodiments of the present invention can drive the plurality of types of brushless direct current motors.

DESCRIPTION OF THE DRAWINGS

The features, natures, advantages and benefits of the present disclosure will become more apparent from the following detailed description made with reference to the accompanying drawings. In the drawings.

DETAILED DESCRIPTION

Figure 1:
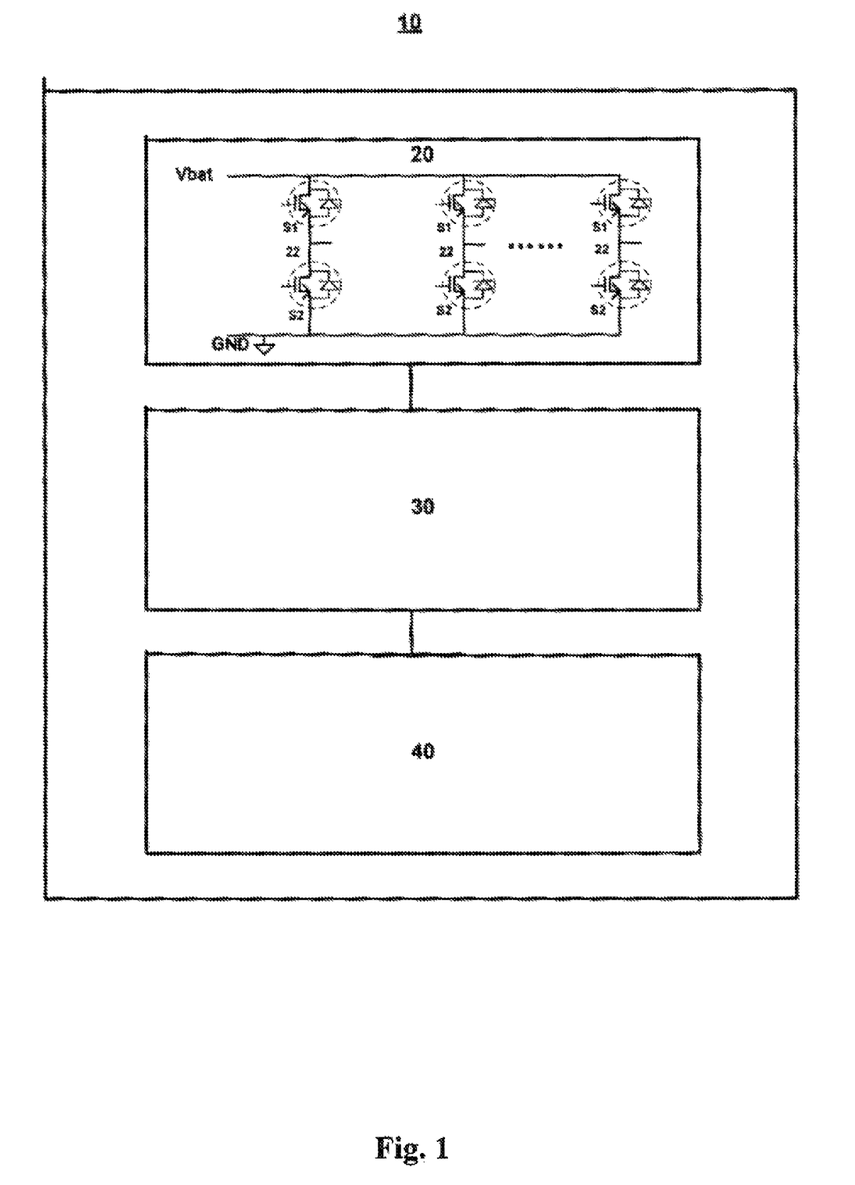
FIG. 1 shows a schematic diagram of a general structure of a driving apparatus for driving a brushless direct current motor according to an embodiment of the present invention.

Referring now to FIG. 1, which shows a schematic diagram of a general structure of a driving apparatus for driving a brushless direct current motor according to an embodiment of the present invention. The driving apparatus 10 shown in FIG. 1 may include a driving circuit 20, a zero crossing detection module 30 and a control module 40.

The driving circuit 20 may include at least three half-bridge circuits 22, each half-bridge circuit 22 may include two power switching devices S1, S2 connected in series and is configured for providing a voltage to a terminal of one of coil(s) of rotor(s) of at least one type of brushless direct current motor. Herein, each of the power switching devices S1, S2 may be, for example, a gate turn-off thyristor (GTO), a giant transistor (GTR), a power metal oxide semiconductor (Power MOSFET), an insulated gate bipolar transistor (IGBT), an integrated gate commutated thyristor (IGCT), a sym-metrical gate commutated thyristor (SGCT) or the like. The at least one type of brushless direct current motor may be, for example, two or three of the 1H bridge brushless direct current motor, the 2H bridge brushless direct current motor and the three-phase brushless direct current motor.

The zero crossing detection module 30 may detect whether coils included in rotors of a plurality of types of brushless direct current motors experience back electromotive force (BEMF) zero crossing, and provide, based on information on a type of the brushless direct current motor drived by the driving apparatus 10 currently, the control module 40 with an indication signal for indicating whether coil(s) included in the rotor of the brushless direct current motor drived by the driving apparatus 10 currently experiences BEMF zero crossing.

The control module 40 may transmit to the zero crossing detection module 30 the information on the type of the brushless direct current motor drived by the driving apparatus 10 currently, generate pulse width modulation (PWM) signals for controlling the power switching devices in the control circuit 40 based on the indication signal provided by the zero crossing detection module 30, and output the generated PWM signals to the power switching devices in the control circuit 40 to control opening or closing of the power switching devices. The control module 40 may be implemented for example by a field programmable gate array (FPGA), an industrial computer, a general computer or the like.

Herein, it is known that the control module 40 generates PWM signals for controlling the power switching devices in the driving circuit 20 based on the indication signal for indicating whether the coil(s) included in the rotor of the brushless direct current motor experiences BEMF zero crossing, so description thereof is omitted herein.

It can be seen from the above description that the zero crossing detection module 30 of the driving apparatus 10 can detect whether the coils included in the rotors of the plurality of types of brushless direct current motors experience BEMF zero crossing, so the driving apparatus can drive the plurality of types of brushless direct current motors.

Figure 2:
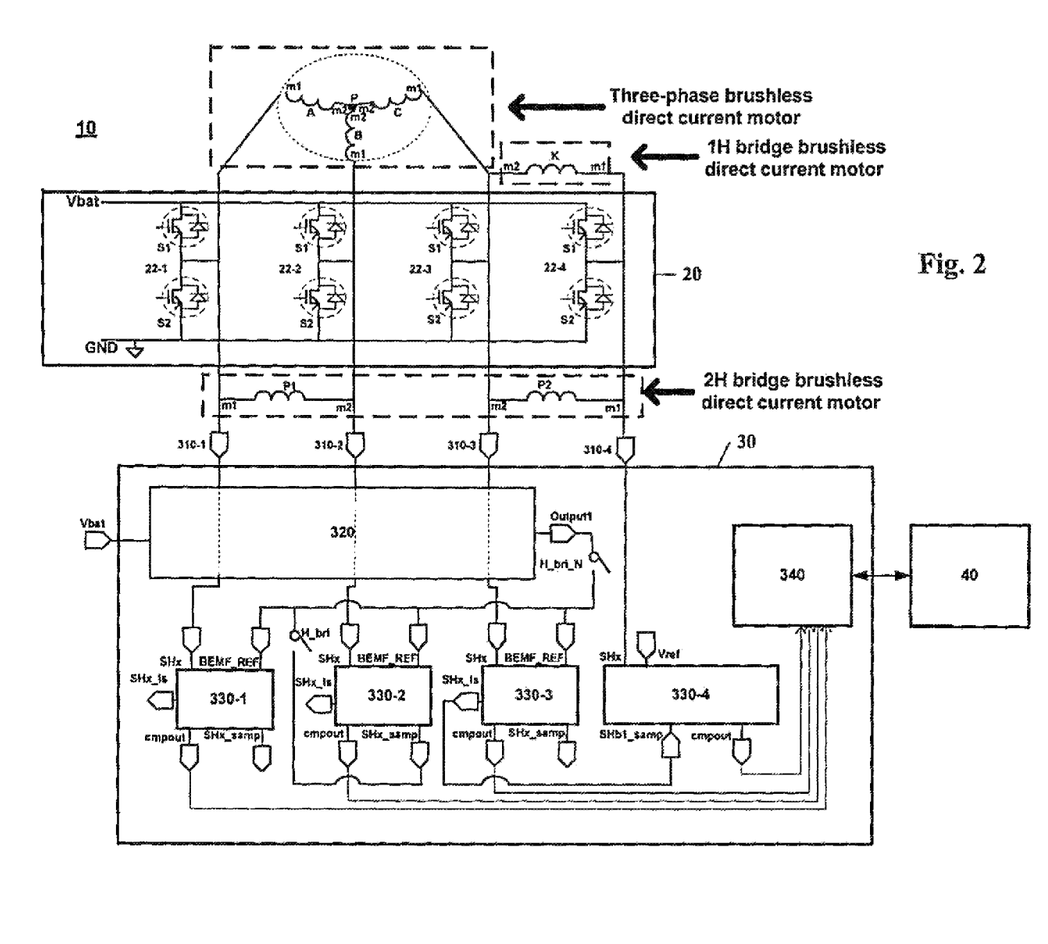
FIG. 2 shows a schematic diagram of a specific structure of a driving apparatus for driving a brushless direct current motor according to an embodiment of the present invention.

Referring now to FIG. 2, which shows a schematic diagram of a specific structure of a driving apparatus for driving a brushless direct current motor according to an embodiment of the present invention, the driving apparatus 10 shown in FIG. 2 may drive the 1H bridge brushless direct current motor, the 2H bridge brushless direct current motor and the three-phase brushless direct current motor.

As shown in FIG. 2, the driving circuit 20 of the driving apparatus 10 may include four halt-bridge circuits 22-1, 22-2, 22-3 and 22-4. Wherein, when the brushless direct current motor driven by the driving apparatus 10 currently is the three-phase brushless direct current motor, the hall-bridge circuit 22-1 is connected to a terminal m1 not connected to the star point P of the A phase coil of the rotor of the three-phase brushless direct current motor to provide the terminal m1 of the A phase coil with a voltage, the half-bridge circuit 22-2 is connected to a terminal m1 not connected to the star point P of the B phase coil of the rotor of the three-phase brushless direct current motor to provide the terminal m1 of the B phase coil with a voltage, and the half-bridge circuit 22-3 is connected to a terminal m1 not connected to the star point P of the C phase coil of the rotor of the three-phase brushless direct current motor to provide the terminal m1 of the C phase coil with a voltage. When the brushless direct current motor driven by the driving apparatus 10 currently is the 2H bridge brushless direct current motor, the half-bridge circuits 22-1 and 22-2 are connected respectively to terminals m1 and m2 of a coil P1 of the rotor of the 2H bridge brushless direct current motor to provide the terminals m1 and m2 of the coil P1 with voltages, and the half-bridge circuits 22-3 and 22-4 are connected respectively to terminals m1 and m2 of another coil P2 of the rotor of the 2H bridge brushless direct current motor to provide the terminals m1 and m2 of the coil P2 with voltages. When the brushless direct current motor driven by the driving apparatus 10 currently is the 1H bridge brushless direct current motor, the half-bridge circuits 22-3 and 22-4 are connected respectively to terminals m1 and m2 of a coil K of the rotor of the 1H bridge brushless direct current motor to provide the terminals m1 and m2 of the coil K with voltages.

The zero crossing detection module 30 of the driving apparatus 20 may include four input terminals 310-1, 310-2, 310-3 and 310-4, a generating circuit 320, four detecting circuits 330-1, 330-2, 330-3 and 330-4, and a providing module 340.

For the input terminals 310-1, 310-2, 310-3 and 310-4, when the brushless direct current motor driven by the driving apparatus 10 currently is the three-phase brushless direct current motor, the input terminals 310-1, 310-2, 310-3 are connected respectively to the terminal m1 of the A phase coil, the terminal m1 of the B phase coil and the terminal m1 of the C phase coil of the rotor of the three-phase brushless direct current motor to obtain a voltage of the terminal m1 of the A phase coil, a voltage of the terminal m1 of the B phase coil and a voltage of the terminal m1 of the C phase coil; when the brushless direct current motor driven by the driving apparatus 10 currently is the 2H bridge brushless direct current motor, the input terminals 310-1, 310-2 are connected respectively to the two terminals m1 and m2 of the coil P1 of the rotor of the 2H bridge brushless direct current motor to obtain a voltage of the terminal m1 of the coil P1 and a voltage of the terminal m2 of the coil P1, and the input terminals 310-3, 310-4 are connected respectively to the two terminals m1 and m2 of the coil P2 of the rotor of the 2H bridge brushless direct current motor to obtain a voltage of the terminal m1 of the coil P2 and a voltage of the terminal m2 of the coil P2; and when the brushless direct current motor driven by the driving apparatus 10 currently is the 1H bridge brushless direct current motor, the input terminals 310-3, 310-4 are connected respectively to the two terminals m1 and m2 of the coil K of the rotor of the 1H bridge brushless direct current motor to obtain a voltage of the terminal m1 of the coil K and a voltage of the terminal m2 of the coil K.

The generating circuit 320 may generate a reference voltage R1 for the three-phase brushless direct current motor, as voltages of terminals m2 connected to the star point P of the A phase coil, if a B phase coil and the C phase coil.

Each of the detecting circuits 3304, 330-2, 330-3 and 330-4 is configured for detecting, at least based on voltages of two terminals of a certain coil of rotor(s) of at least one type of brushless direct current motor, whether the certain coil experiences BEMF zero crossing, and outputting a detecting signal for indicating whether the certain coil experiences BEMF zero crossing. Herein, if a difference of the voltages of the two terminals of the certain coil is near or equal to zero, it indicates that the certain coil experiences BEMF zero crossing, and if not, it indicates that the certain coil does not experience BEMF zero crossing.

Each of the detecting circuits 330-1, 330-2, 330-3 has two input terminals SHx, BEMF_REF and three output terminals SHx_Is, cmpout, SHx_samp, and the detecting circuit 330-4 has three input terminals SHx, Vref, SHb1_samp and an output terminal cmpout.

The input terminal SHx of the detecting circuit 330-1 is connected to the input terminal 310-1, the input terminal BEMF_REF of the detecting circuit 330-1 is connected to the generating circuit 320 via a switch H_bri_N and to the output terminal SHx_samp of the detecting circuit 330-2 via a switch H_bri.

The input terminal SHx of the detecting circuit 330-2 is connected to the input terminal 310-2, and the input terminal BEMF_REF of the detecting circuit 330-2 is connected to the generating circuit 320 via the switch H_bri_N.

The input terminal SHx of the detecting circuit 330-3 is connected to the input terminal 310-3, the input terminal BEMF_REF of the detecting circuit 330-3 is connected to the generating circuit 320 via the switch H_bri_N, and the output terminal SHx_Is of the detecting circuit 330-3 is connected to the input terminal SHb1_samp of the detecting circuit 330-4.

The input terminal SHx of the detecting circuit 330-4 is connected to the input terminal 310-4, and the input terminal Vref of the detecting circuit 330-4 receives a reference signal R2 for enabling pre-commutation. Since there exists the reference signal R2 for enabling pre-commutation, the detecting circuit 330-4 may output, when BEMF of a detected coil is very close to bin does not reach zero point, an indication signal for indicating that the detected coil experiences BEMF zero crossing, so that commutation of supplying of power to the detected coil is advanced.

When the brushless direct current motor driven by the driving apparatus 10 currently is the three-phase brushless direct current motor, the switch H_bri_N is closed and the switch H_bri is opened. In this case, the detecting circuit 330-1 obtains the voltage of the terminal m1 and the voltage of the terminal m2 (i.e., the reference voltage R1) of the A phase coil of the rotor of the three-phase brushless direct current motor via the input terminals SHx and BEMF_REF of the detecting circuit 330-1, detects whether the A phase coil experiences BEMF zero crossing based on a difference between the obtained voltages of the two terminals of the A phase coil, and outputs via the output terminal cmpout of the detecting circuit 330-1 the indication signal for indicating whether the A phase coil experiences BEMF zero crossing; the detecting circuit 330-2 obtains the voltage of the terminal m1 and the voltage of the terminal m2 (i.e., the reference voltage R1) of the B phase coil of the rotor of the three-phase brushless direct current motor via the input terminals SHx and BEMF_REF of the detecting circuit 330-2, detects whether the B phase coil experiences BEMF zero crossing based on a difference between the obtained voltages of the two terminals of the B phase coil, and outputs via the output terminal cmpout of the detecting circuit 330-2 the indication signal for indicating whether the B phase coil experiences BEMF zero crossing; and the detecting circuit 330-3 obtains the voltage of the terminal m1 and the voltage of the terminal m2 (i.e., the reference voltage R1) of the C phase coil of the rotor of the three-phase brushless direct current motor via the input terminals SHx and BEMF_REF of the detecting circuit 330-3, detects whether the C phase coil experiences BEMF zero crossing based on a difference between the obtained voltages of the two terminals of the C phase coil, and outputs via the output terminal cmpout of the detecting circuit 330-3 the indication signal for indicating whether the C phase coil experiences BEMF zero crossing.

When the brushless direct current motor driven by the driving apparatus 10 currently is the 2H bridge brushless direct current motor, the switch H_bri_N is opened and the switch H_bri is closed. In this case, the detecting circuit 330-2 obtains the voltage of the terminal m2 of the coil P1 of the rotor of the 2H bridge brushless direct current motor via the input terminals SHx the detecting circuit 330-2 and outputs via the output terminal SHx_samp of the detecting circuit 330-2 the voltage of the terminal m2 of the coil P1, thereby the voltage of the terminal m2 of the coil P1 is provided to the intuit terminal BEMF_REF of the detecting circuit 330-1; the detecting circuit 330-3 obtains the voltage of the terminal m2 of the coil P2 of the rotor of the 2H bridge brushless direct current motor via the input terminals SHx the detecting circuit 330-3 and outputs via the output terminal SHx_Is of the detecting circuit 330-3 the voltage of the terminal m2 of the coil P2, thereby the voltage of the terminal m2 of the coil P2 is provided to the input terminal SHb1_samp of the detecting circuit 330-4; the detecting circuit 330-1 obtains the voltages of the terminal m1 and the terminal m2 of the coil P1 of the rotor of the 2H bridge brushless direct current motor via the input terminals SHx and BEMF_REF of the detecting circuit 330-1, detects whether the coil P1 experiences BEMF zero crossing based on a difference between the obtained voltages of the two terminals of the coil P1, and outputs via the output terminal cmpout of the detecting circuit 330-1 the indication signal for indicating whether the coil P1 experiences BEMF zero crossing; and the detecting circuit 330-4 obtains the voltages of the terminal m1 and the terminal m2 of the coil P2 of the rotor of the 2H bridge brushless direct current motor and the reference signal K2 for enabling pre-commutation via the input terminals SHb1_samp, SHx and Vref of the detecting circuit 330-4, detects whether the coil P2 experiences BEMF zero crossing based on the obtained voltages of the two terminals of the coil P2 and the reference signal R2, and outputs via the output terminal cmpout of the detecting circuit 330-4 the indication signal for indicating whether the coil P2 experiences BEMF zero crossing.

When the brushless direct current motor driven by the driving apparatus 10 currently is the 1H bridge brushless direct current motor, the switch H_bri_N and the switch H_bri are opened. In this case, the detecting circuit 330-3 obtains the voltage of the terminal m1 of the coil K of the rotor of the 1H bridge brushless direct current motor via the input terminal SHx of the detecting circuit 330-3 and outputs the voltage of the terminal m2 of the coil K via the output terminal SHx_Is of the detecting circuit 330-3, thereby the voltage of the terminal m2 of the coil K is provided to the input terminal SHb1_samp of the detecting circuit 330-4; and the detecting circuit 330-4 obtains the voltages of the terminal m1 and the terminal m2 of the coil K of the rotor of the 1H bridge brushless direct current motor and the reference signal R2 for enabling pre-communication via the input terminals SHb1_samp, SHx and Vref of the detecting circuit 330-4, detects whether the coil K experiences BEMF zero crossing based on the obtained voltages of the two terminals of the coil K and the reference signal R2, and outputs via the output terminal cmpout of the detecting circuit 330-4 the indication signal for indicating whether the coil K experiences BEMF zero crossing.

The providing module 340 is connected to the control module 40 and the output terminals cmpout of the detecting circuits 330-1, 330-2, 330-3 and 330-4. The providing module 340 receives information on the type of the brushless direct current motor driven by the driving apparatus 10 currently, which is sent by the control module 40. When the information on the type of the brushless direct current motor driven by the driving apparatus 10 currently indicates that the brushless direct current motor driven by the driving apparatus 10 currently is the three-phase brushless direct current motor, the providing module 340 controls that the switch H_bri_N is closed and the switch H_bri is opened, and provides the control module 40 with the indication signals outputted by the detecting circuits 330-1, 330-2 and 330-3. When the information on the type of the brushless direct current motor driven by the driving apparatus 10 currently indicates that the brushless direct current motor driven by the driving apparatus 10 currently is the 2H bridge brushless direct current motor, the providing module 340 controls that the switch H_bri_N is opened and the switch H_bri is closed, and provides the control module 40 with the indication signals outputted by the detecting circuits 330-1 and 330-4. When the information for indicating the type of the brushless direct current motor driven by the driving apparatus 10 currently indicates that the brushless direct current motor driven by the driving apparatus 10 currently is the 1H bridge brushless direct current motor, the providing module 340 controls that the switch H_bri_N and the switch H_bri are opened, and provides the control module 40 with the indication signal outputted by the detecting circuit 330-4. The providing module 340 may be implemented by for example an integrated circuit, a field-programmable gate array (FPGA), a single chip microcomputer or the like.

Figure 3:
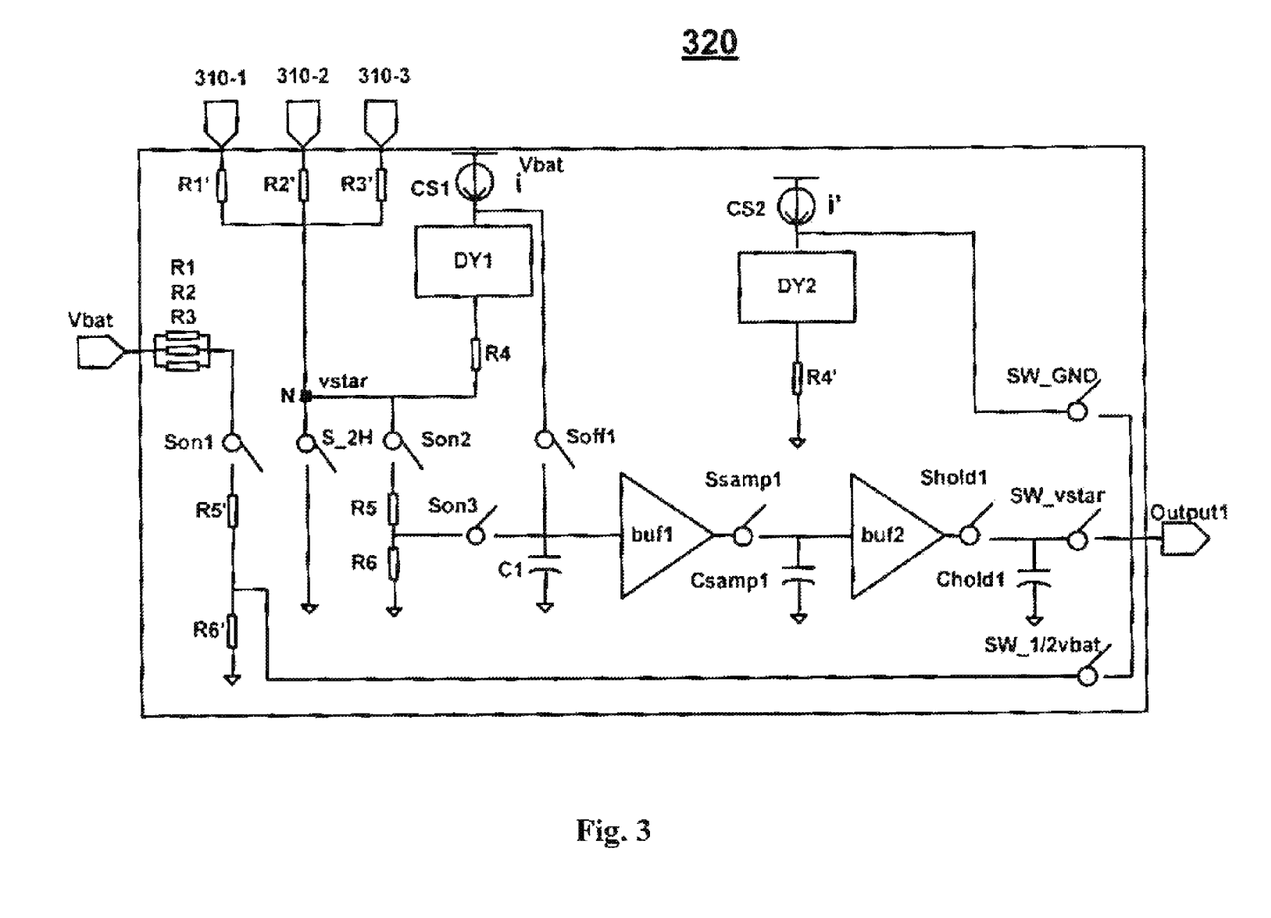
FIG. 3 shows a schematic diagram of a generating circuit according to an embodiment of the present invention.

Referring now to FIG. 3, which shows a schematic diagram of a generating circuit according to an embodiment of the present invention.

As shown in FIG. 3, the generating circuit 320 may include resistances R1, R2, R3, R5' and R6' switches Son1 and SW_½vbat, and an output terminal Output1. The resistances R1, R2, R3 have the same resistance value, and a resistance value of the resistance R6' is equal to a sum of a resistance value of the resistance R5' and a resistance value of the resistances R1, R2, R3 connected in parallel. A terminal of the switch Son1 is connected to a work voltage Vbat of the driving apparatus 10 via the resistances R1, R2, R3 connected in parallel, and another terminal of the switch Son1 is connected to the ground via the resistances R5' and R6'. A terminal of the switch SW_½vbat is connected between the resistances R5' and R6' and another terminal of the switch SW_½vbat is connected to the output terminal Output1.

If the switches SW_½vbat and Son1 are closed, a half of the work voltage Vbat of the driving apparatus 10 (i.e., ½Vbat) is provided to the output terminal Output1.

The generating circuit 320 may further include resistances R1', R2', R3', R4, R5 and R6, switches S_2H, Son2, Son3, Ssamp1, Shold1$_x$ Soff1 and SW_vstar, capacitors C1, Csamp1 and Chold1, a current source CS1, a level shift DY1, and buffers buf1 and buf2. The resistances R1', R2', R3' have the same resistance value, and each of the resistances R1', R2', R3' has the same resistance value as each of the resistances R1, R2, R3. The resistance value of the resistance R6 divided by a sum of the resistance values of the resistances R5 and R6 is equal to twice the resistance value of the resistance R6' divided by a sum of the resistance values of the resistances R5' and R6'. A terminal of the resistance R1 of a terminal of the resistance R2' and a terminal of the resistance R3' are connected respectively to the input terminals 310-1, 310-2, 310-3 of the zero crossing detection module 30, and another terminal of the resistance R1', another terminal of the resistance R2' and another terminal of the resistance R3' are connected to a common point N, wherein the point N is connected to the ground via the switch S_2H and to the ground via the switch Son2 and the resistances R5, R6 in proper order. The current source CS1 is connected to the point N via the level shift DY1 and the resistance R4 in proper order. A terminal of the switch Son3 is connected between the resistances R5 and R6, and another terminal of the switch Son3 is connected to the output terminal Output1 via the buffer buf1, the switch Ssamp1, the buffer buf2, the switch Shold1 and the switch SW_vstar in proper order. A terminal of the switch Soff1 is connected to the current source CS1, and another terminal of the switch Soff1 is connected between the switch Son3 and the buffer buf1. A terminal of the capacitor C1 is connected between the switch Son3 and the buffer buf2, and another terminal of the capacitor C1 is connected to the ground. A terminal of the capacitor Csamp1 is connected between the switch Ssamp1 and the buffer buf2, and another terminal of the capacitor Csamp1 is connected to the ground. A terminal of the capacitor Chold1 is connected between the switches Shold1 and SW_vstar, and another terminal of the capacitor Chold1 is connected to the ground.

Wherein the buffer buf1, the switch Ssamp1 and the capacitor Csamp1 form a sampler, and the buffer buf2, the switch Shold1 and the capacitor Chold1 form a holder.

When the brushless direct current motor driven by the driving apparatus 10 currently is the three-phase brushless direct current motor, the switch S_2H is opened, and when the brushless direct current motor driven by the driving apparatus 10 currently is the 1H bridge brushless direct current motor or the 2H bridge brushless direct current motor, the switch S_2H is closed.

When the PWM signal outputted to the driving circuit 20 by the control module 40 is high level (i.e., PWM is on), the switches Son2 and Son3 are closed and the switch Soff1 is opened, and when the PWM signal outputted to the driving circuit 20 by the control module 40 is low level (i.e., PWM is off), the switches Son2 and Son3 are opened and the switch Soff1 is closed.

When the switch SW-vstar is closed, since the connection way of the resistances R1', R2' and R3' makes the point N to be a virtual star point corresponding to the star point P of the three-phase brushless direct current motor, a star point voltage Vstar of the three-phase brushless direct current motor is obtained at the virtual star point N. If the switches Son2 and Son3 are closed and the switch Soff1 is opened, the star point voltage Vstar is provided to the sampler formed by the buffer buf, the switch Ssamp1 and the capacitor Csamp1 via the switch Son2, the resistance R5 and the switch Son1, and if the switches Son2 and Son3 are opened and the switch Soff1 is closed, the star point voltage Vstar is provided to the sampler formed by the buffer buf1, the switch Ssamp1 and the capacitor Csamp1 via the switch Soff1 after the star point voltage Vstar is boosted by the level shift DY1. The sampler formed by the buffer buf1, the switch Ssamp1 and the capacitor Csamp1 samples the received star point voltage Vstar. The holder formed by the buffer buf2, the switch Shold1 and the capacitor Chold1 holds the star point voltage Vstar sampled by the sampler and outputs it to the output terminal Output1.

The generating circuit 320 may further include a resistance R4', a level shift DY2, a current source CS2 and a switch SW_GND.

The current i' of the current source CS2 is the same as the current i of the current source CS1. The resistance R4' has the same resistance value as the resistance R4.

The current source CS2 is connected to the ground via the level shift DY2 and the resistance R4' in proper order, A terminal of the switch SW_GND is connected between the current source CS2 and the level shift DY2, and another terminal of the switch SW_GND is connected to the output terminal Output1.

If the switch SW_GND is closed, a voltage obtained by boosting a voltage 0 v with the level shift DY2, as the ground voltage GND, is provided to the output terminal Output1 via the switch SW_GND.

For the generating circuit 320, if it is intended that ½Vbat is outputted as the reference voltage R1, the switch SW_½vbat is closed and the switches SW_vstar and SW_GND are opened; if it is intended that the star point Vstar is outputted as the reference voltage R1, the switch SW_vstar is closed and the switches SW_½vbat and SW_GND are opened; and if it is intended that the ground voltage GND is outputted as the reference voltage R1, the switch SW_GND is closed and the switches SW_vstar and SW_½vbat are opened.

Performing of opening or closing operation of the switches of the generating circuit 320 is implemented by the proving module 340.

Figure 4:
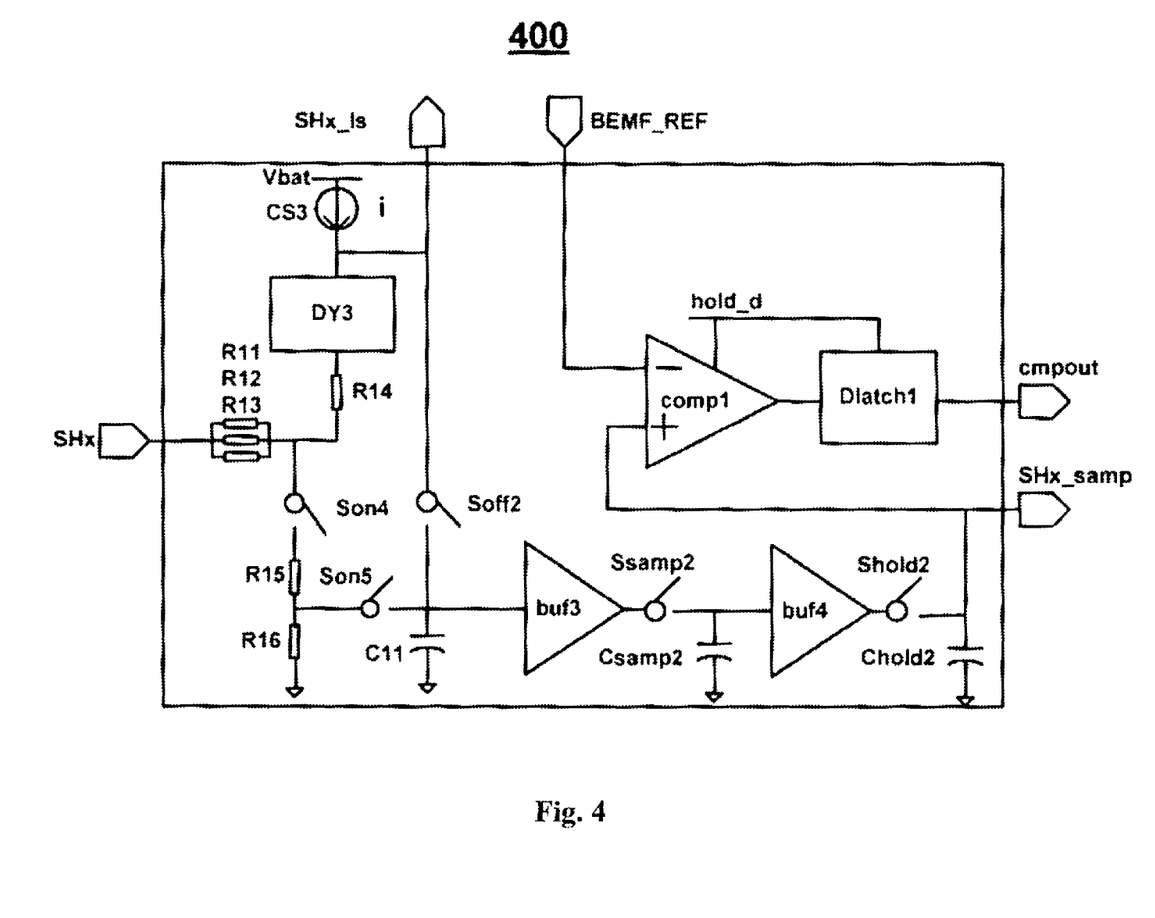
FIG. 4 shows a schematic diagram of a detecting circuit according to an embodiment of the present invention.

Referring now to FIG. 4, which shows a schematic diagram of a detecting circuit according to an embodiment of the present invention. The detecting circuit 400 shown in FIG. 4 corresponds to each of the detecting circuits 330-1, 330-2 and 330-3.

The detecting circuit 400 may include two input terminals SHx and BEMF_REF, three output terminals SHx_Is, cmpout and SHx_samp, resistances R11, R12, R13, R14, R15 and R16, switches Son4, Son5, Soff2, Ssamp2 and Shold2, capacitors C11, Csamp2 and Chold2, a current source CS3, a level shift DY3, buffers buf3 and buf4, a comparator Comp1 and a latch Dlatch1.

A terminal of the switch Son4 is connected to the input terminal SHx via the resistances R11, R12 and R13 connected in parallel, and another terminal of the switch Son4 is connected to the ground via the resistances R15 and R16 in proper order.

A terminal of the switch Son5 is connected between the resistances R15 and R16, and another terminal of the switch Son5 is connected to the output terminal SHx_samp and a positive input terminal (+) of the comparator Comp1 via the buffer buf3, the switch Ssamp2, the buffer buf4 and the switch Shold2 in proper order.

The current source CS3 is connected, via the level shift DY3 and the resistance R14 in proper order, between the switch Son4 and the resistances R11, R12, R13 connected in parallel.

A terminal of the switch Soff2 is connected to the output terminal SHx_Is and between the current source CS3 and the level shift DY3, and another terminal of the switch Soff2 is connected between the switch Son5 and the buffer buf3.

A terminal of the capacitor C11 is connected between the switch Son5 and the buffer buf3, and another terminal of the capacitor C11 is connected to the ground.

A terminal of the capacitor Csamp2 is connected between the switch Ssamp2 and the buffer buf4, and another terminal of the capacitor Csamp2 is connected to the ground. The capacitor Csamp2, the switch Ssamp2 and the buffer buf3 form a sampler.

A terminal of the capacitor Chold2 is connected between the switch Shold2 and the output terminal SHx_samp, and another terminal of the capacitor Shold2 is connected to the ground. The capacitor Chold2, the switch Shold2 and the buffer buf4 form a holder.

A negative input terminal (−) of the comparator Comp1 is connected to the input terminal BEMF_REF, and an output terminal of the comparator Comp1 is connected to the output terminal cmpout via the latch Dlatch1.

When the PWM signal outputted to the driving circuit 20 by the control module 40 is high level (i.e., PWM is on), the switches Son4 and Son5 are closed and the switch Soff2 is opened, and when the PWM signal outputted to the driving circuit 20 by the control module 40 is low level (i.e., PWM is off), the switches Son4 and Son5 are opened and the switch Soff2 is closed.

Performing of opening or closing operation of the switches included in the detecting circuit 400 is implemented by the providing module 340.

It can be seen from FIG. 4 that in the detecting circuit 400, the signal from the input terminal SHx, winch is subject to sampling by the sampler formed by the capacitor Csamp2, the switch Ssamp2 and the buffer buf3 and holding by the holder formed by the capacitor Chold2, the switch Shold2 and the buffer buf4, is provided to the output terminal SHx_samp and the positive input terminal of the capacitor Comp1, the capacitor Comp1 calculates and outputs a difference between the signal received from the input terminal BEMF_REF by the negative input terminal of the capacitor Comp1 and the signal received by the positive input terminal of the capacitor Comp1, and the difference outputted by the capacitor Comp1 is provided to the output terminal cmpout via the latch Dlatch1. Further, in the detecting circuit 400, the signal from the input terminal SHx, which is boosted by the level shift DY3, is also provided to the output terminal SHx_Is.

Figure 5:
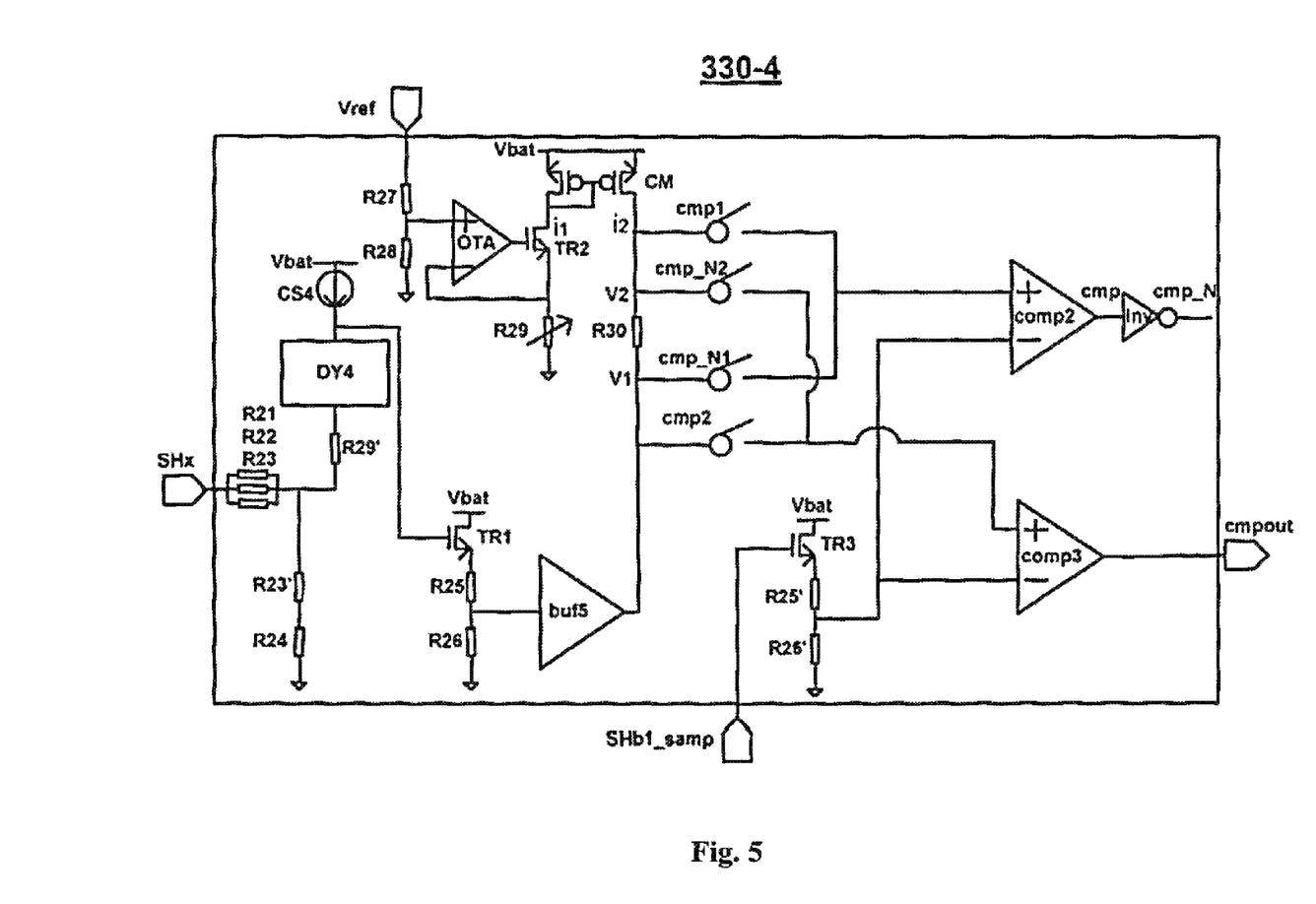
FIG. 5 shows a schematic diagram of a detecting circuit according to another embodiment of the present invention.

Referring now to FIG. 5, which shows a schematic diagram of a detecting circuit according to another embodiment of the present invention. The detecting circuit shown in FIG. 5 is the detecting circuit 330-4.

As shown in FIG. 5, the detecting circuit 330-4 may include three input terminals SHx, Vref and SHb1_samp, an output terminal cmpout, resistances R21, R22, R23, R23', R24, R25, R26, R27, R28, R29, R29' and R30, a buffer buf5, a current source CS4, a level shift DY4, an operational amplifier OTA, transistors TR1, TR2, and a current mirror CM. Wherein, the resistance R25 has the same resistance value as the resistance R27, and the resistance R26 has the same resistance value as the resistance R28. The resistance R29 is a programmable resistance and its resistance value is variable.

A terminal of the resistance R23' is connected to the input terminal SHx via the resistances R21, R22 and R23 connected in parallel, and another terminal of the resistance R23' is connected to the ground via the resistance R24.

The current source CS4 is connected, via the level shift DY4 and the resistance R29' in proper order, between the resistance R23' and the resistances R21, R22, R23 connected in parallel.

A base (or a gate) of the transistor TR1 is connected between the current source CS4 and the level shift DY4, a collector (or a source) of the transistor TR1 is connected to the work voltage Vbat, and an emitter (or a drain) of the transistor TR1 is connected to the ground via the resistances R25 and R26 in proper order.

The input terminal Vref is connected to the ground via the resistances R27 and R28 in proper order.

A first output terminal of the current mirror CM is connected to the collector (or the source) of the transistor TR2, the emitter (or the drain) of the transistor TR2 is connected to the ground via the resistance R29. A positive input terminal of the operational amplifier OTA is connected between the resistances R27 and R28, a negative input terminal of the operational amplifier OTA is connected between the emitter (or the drain) of the transistor TR2 and the resistance R29, and an output terminal of the operational amplifier OTA is connected to the base (or the gate) of the transistor TR2.

A second output terminal of the current mirror CM is connected to an output terminal of the buffer buf5 via the resistance R30, and an input terminal of the buffer buf5 is connected between the resistances R25 and R26.

The detecting circuit 330-4 may further include switches cmp1, cmp_N1, cmp2 and cmp_N2, a transistor TR3, resistances R25' and R26', comparators comp2 and comp3, and an inverter inv. Wherein, the resistance R25' has the same resistance value as the resistance R25, and the resistance R26' has the same resistance value as the resistance R26.

A base (or a gate) of the transistor TR3 is connected to the input terminal SHb1_samp, a collector (or a source) of the transistor TR3 is connected to the work voltage Vbat, and an emitter (or a drain) of the transistor TR3 is connected to the ground via the resistances R25' and R26' in proper order.

A terminal of the switch cmp1 is connected between the second output terminal of the current mirror CM and the resistance R30, and another terminal of the switch cmp1 is connected to a positive input terminal (+) of the comparator comp2. A terminal of the switch cmp_N1 is connected between the resistance R30 and the buffer buf5, and another terminal of the switch cmp_N1 is connected to the positive input terminal (+) of the comparator comp2. A negative input terminal (−) of the comparator comp2 is connected between the resistances R25' and R26', and an output terminal of the comparator comp2 is connected to an input terminal of the inverter inv.

A terminal of the switch cmp1 is connected between the resistance R30 and the buffer buf5, and another terminal of the switch cmp2 is connected to a positive input terminal (+) of the comparator comp3. A terminal of the switch cmp_N2 is connected between the second output terminal of the current mirror CM and the resistance R30, and another terminal of the switch cmp_N2 is connected to the positive input terminal (+) of the comparator comp3. A negative input terminal (−) of the comparator comp3 is connected between the resistances R25' and R26', and an output terminal of the comparator comp3 is connected to the output terminal cmpout of the detecting circuit 330-4.

When the output cmp of the comparator comp2 is high level, the switches cmp1 and cmp2 are closed, and when the output cmp of the comparator comp2 is low level, the switches cmp1 and cmp2 are opened.

When the output cmp_N of the inverter inv is high level, the switches cmp_N1 and cmp_N2 are closed, and when the output cmp_N of the inverter inv is low level, the switches cmp_N1 and cmp_N2 are opened.

The detecting circuit 330-4 is configured for outputting the indication signal for indicating that the coil P2 of the rotor of the 2H bridge brushless direct current motor or the coil K of the rotor of the 1H bridge brushless direct current motor experiences BEMF zero crossing before it is detected that the coil P2 or K experiences BEMF zero crossing, so that advancing of commutation of supplying of power to the coil P2 or K is realized.

Specifically, the voltage of the terminal m2 of the coil P2 or K is inputted to the detecting circuit 330-4 via the input terminal SHb1_samp, and is then provided to the negative input terminals of the comparators comp2 and comp3 via the transistor TR3 and the resistances R25', R26'. The voltage of the terminal m1 of the coil P2 or K is inputted to the detecting circuit 330-4 via the input terminal SHx, and is then provided, after being boosted by the level shift DY4, between the resistance R30 and the buffer buf5 via the transistor TR1, the resistances R25, R26 and the buffer buf5, which is represented with a voltage V1. The reference signal R2 for enabling pre-commutation is inputted to the detecting circuit 330-4 via the input terminal Vref, and then generates, under the influence of the resistances R27, R28, R29, the operational amplifier OTA and the transistor TR2, a current i1 in a branch on which the first output terminal of the current mirror CM is located. The current mirror CM copies, through mirror effect, the current i1 to a branch on which the resistance R30 is located, thereby a current i2 that is the same as the current i1 is generated in the branch on which the resistance R30 is located. Since there exists the current i2, there is a voltage difference $\Delta v = i2 * R30$ of the voltage V2 between the second output terminal of the current mirror CM and the resistance R30 and the voltage V1 between the resistance R30 and the buffer buf5, i.e., $V2=V1+\Delta v$. The comparator comp2 and the inverter inv control opening or closing of the switches cmp1, cmp_N1, cmp2 and cmp_N2, so that the voltage V2 is provided to the positive input terminal of the comparator comp3 when BEMF of the coil P2 or K is on a rising edge (i.e., BEMF of the coil P2 or K increases gradually), and the voltage V1 is provided to the positive input terminal of the comparator comp3 when BEMF of the coil P2 or K is on a falling edge (i.e., BEMF of the coil P2 or K decreases gradually). Since the voltage V2 ($=V1+\Delta v$) is provided to the positive input terminal of the comparator comp3 when BEMF of the coil P2 or K is on a rising edge, the voltage of the terminal m2 of the coil P2 or K that is inputted to the negative input terminal of the comparator comp3 has been equal to the voltage V2 that is inputted to the positive input terminal of the comparator comp3 when it is $\Delta v$ before BEMF of the coil P2 or K reaches zero point, thereby the comparator comp3 outputs to the output terminal cmpout of the detecting circuit 330-4 the detection signal for indicating that the coil P2 or K experiences BEMF zero crossing. That is, under the condition that BEMF of the coil P2 or K is on a rising edge, when it is $\Delta v$ before BEMF of the coil P2 or K reaches zero point, the detecting circuit 330-4 outputs the indication signal for indicating that the coil P2 or K experiences BEMF zero crossing, winch makes that commutation of supplying of power to the coil P2 or K is advanced under the condition that BEMF of the coil P2 or K is on a rising edge. Under the condition that BEMF of the coil P2 or K is on a falling edge, the voltage V1 that is inputted to the positive input terminal of the comparator comp3 is the voltage of the terminal m1 of the coil P2 or K, and the voltage that is inputted to the negative input terminal of the comparator comp3 is the voltage of the terminal m2 of the coil P2 or K, so commutation of supplying of power to the coil P2 or K is not advanced under the condition that BEMF of the coil P2 or K is on a tailing edge.

A magnitude of the current i1 may be varied by changing a magnitude of the resistance value of the resistance R29 of the detecting circuit 330-4, so that an advance amount by which commutation of supplying of power to the coil P2 or K is advanced is changed.

OTHER MODIFICATIONS

Those skilled in the art will appreciate that the generating circuit 320 shown in FIG. 3 includes the circuit component for generating ½Vbat as the reference voltage R1, the circuit component for generating the star point voltage Vstar as the reference voltage R1 and the circuit component for generating the ground voltage GND as the reference voltage R1, but the present invention is not so limited. In other some embodiments of the present invention, the generating circuit 320 may also include only one or two of the three circuit components.

Those skilled in the art will appreciate that in the driving apparatus 10 shown in FIG. 2, the zero crossing detection module 30 includes some detecting circuits for detecting whether the coils of the rotors of two types of brushless direct current motors experience BEMF zero crossing, for example, the detecting circuit 330-1 is configured for detecting whether the A phase coil of the rotor of the three-phase brushless direct current motor experiences BEMF zero crossing and for detecting whether the coil P1 of the rotor of the 2H bridge brushless direct current motor experiences BEMF zero crossing, and the detecting circuit 330-4 is configured for detecting whether the coil P2 of the rotor of the 2H bridge brushless direct current motor experiences BEMF zero crossing and for detecting whether the coil K of the rotor of the 1H bridge brushless direct current motor experiences BEMF zero crossing, but the present invention is not so limited. In other some embodiments of the present invention, the zero crossing detection module 30 may also include a sufficient number of detecting circuits, so that each detecting circuit is only configured for detecting whether one of coil(s) of the rotor of one of the plurality of types of brushless direct current motors experiences BEMF zero crossing.

Those skilled in the art will appreciate that the driving apparatus 10 shown in FIG. 2 is designed for driving three types of brushless direct current motors, i.e., the three-phase brushless direct current motor, the 2H bridge brushless direct current motor and the 1H bridge brushless direct current motor, but the present invention is not so limited. In other some embodiments of the present invention, the driving apparatus 10 may be also designed for driving two types or more three types of brushless direct current motors. When the driving apparatus 10 is designed for driving two types of brushless direct current motors, the driving apparatus 10 may be designed for driving, for example, any two of the three-phase brushless direct current motor, the 2H bridge brushless direct current motor and the 1H bridge brushless direct current motor. Wherein, when the driving apparatus 10 is designed for driving the 2H bridge brushless direct current motor and the 1H bridge brushless direct current motor, the driving apparatus 10 may not include the generating circuit 320.

Those skilled in the art will appreciate that in the detecting circuit 330-4 shown in FIG. 5, the voltage V2 is provided to the positive input terminal of the comparator comp3 only under the condition that BEMF of the coil P2 or K is on a rising edge, so that commutation of supplying of power to the coil P2 or K is advanced under the condition that BEMF of the coil P2 or K is on a rising edge, but the present invention is not so limited. In other some embodiments of the present invention, the voltage V2 may also be provided to the positive input terminal of the comparator comp3 under the condition that BEMF of the coil P2 or K is on a falling edge, so that commutation of supplying of power to the coil P2 or K is advanced under the condition that BEMF of the coil P2 or K is on a falling edge.

Embodiments of the present invention also provides a brushless direct current motor, which includes a stator, a rotor and the driving apparatus mentioned above.

Although the above describes the present invention with reference to specific implementations, the scope of the present invention is not limited to these details shown above. Without departing from the basic principles of the present invention, various modifications may be made to the details, and the modifications shall fall within the protection scope of the present invention.

The invention claimed is:

1. A driving apparatus for a brushless direct current motor having rotor coils and terminals configured to connect to the rotor coils, comprising:
at least three half-bridge circuits, each half-bridge circuit including two power switching devices connected in series, each half-bridge circuit being configured to supply a voltage to one of the terminals of the brushless direct current motor;
a zero crossing detection module; and
a control module,
wherein the zero crossing detection module is configure to (i) detect whether the rotor coils of the brushless direct current motor experience back electromotive force (BEMF) zero crossing, (ii) receive information regarding a type of the brushless direct current motor from the control module, (iii) provide the control module with an indication signal that indicates whether the rotor coils of the brushless direct current motor currently experience BEMF zero crossing based on the type of the brushless direct current motor, and
the control module is configured to (i) transmit to the zero crossing detection module the information regarding the type of the brushless direct current motor, and (ii) control the power switching devices of the at least three half-bridge circuits by generating and outputting, based on the indication signal provided by the zero crossing detection module, pulse width modulation signals.

2. The driving apparatus of claim 1, wherein the zero crossing detection module comprises:
at least three input terminals, each input terminal being connected to one of the terminal of the brushless direct current motor for obtaining a voltage;
at least two detecting circuits, each detecting circuit being connected to at least one of the at least three input terminals, each detecting circuit being configured to (i) detect, based on voltages of two terminals of a specified rotor coil of the brushless direct current motor, whether the specified rotor coil experiences BEMF zero crossing, and (ii) output a detecting signal that indicates whether the specified coil experiences BEMF zero crossing; and a providing module configured to provide the control module with the detecting signal outputted by a specified detecting circuit of the at least two detecting circuits based on the type of the brushless direct current motor, the detecting signal outputted by the specified detecting circuit being the indication signal.

3. The driving apparatus of claim 2, wherein:
the rotor coils of the brushless direct current motor include an A phase coil, a B phase coil, and a C phase coil connected in a star arrangement;
the zero crossing detection module further comprises a generating circuit configured to generate a first reference voltage of the brushless direct current motor as a voltage of the terminal of the A phase coil, the terminal of the B phase coil, and the terminal of the C phase coil that are connected together;
the at least three input terminals include a first input terminal, a second input terminal, a third input terminal and a fourth input terminal;
the at least two detecting circuits include a first detecting circuit, a second detecting circuit, a third detecting circuit and a fourth detecting circuit;
the first detecting circuit is configured to at least one of (i) detect based on a voltage from the first input terminal and the first reference voltage, whether the A phase coil experiences BEMF zero crossing and output a detecting signal that indicates whether the A phase coil experiences BEMF zero crossing, and (ii) detect, based on a voltage between the first input terminal and the second input terminal, whether a first coil in a 2H bridge brushless direct current motor whose rotor has only the first coil and a second coil experiences BEMF zero crossing and output a detecting signal for indicating whether the first coil experiences BEMF zero crossing;
the second detecting circuit is configured to detect, based on the voltage from the second input terminal and the first reference voltage, whether the B phase coil experiences BEMF zero crossing and output a detecting signal that indicates whether the B phase coil experiences BEMF zero crossing;
the third detecting circuit is configured to detect, based on the voltage from the third input terminal and the first reference voltage, whether the C phase coil experiences BEMF zero crossing and output a detecting signal that indicates whether the C phase coil experiences BEMF zero crossing; and
the fourth detecting circuit is configured to detect, based on the voltage from the third input terminal, a voltage from the fourth input terminal and a second reference voltage, whether the second coil or a third coil in a 1 H bridge brushless direct current motor whose rotor has only the third coil experiences BEMF zero crossing and output a detecting signal that indicates whether the second coil or the third coil experiences BEMF zero crossing.

4. The driving apparatus of claim 3, wherein the generating circuit is configured to at least one of:
generate the first reference voltage based on the voltage from the first input terminal, the voltage from the second input terminal and the voltage from the third input terminal;
generate a ground voltage as the first reference voltage; and
calculate a half of a work voltage of the driving apparatus as the first reference voltage.

5. The driving apparatus of claim 3, wherein the voltage from the first input terminal, the voltage from the second input terminal, the voltage from the third input terminal and the voltage from the fourth input terminal are subjected to sample and hold processing.

6. A brushless direct current motor, comprising:
a stator;
a rotor having rotor coils and terminals configured to connect to the rotor coils; and
the driving apparatus, the driving apparatus comprising:
at least three half-bridge circuits, each half-bridge circuit including two power switching devices connected in series, each half-bridge circuit being configured to supply a voltage to one of the terminals;
a zero crossing detection module; and
a control module,
wherein the zero crossing detection module is configure to (i) detect whether the rotor coils experience back electromotive force (BEMF) zero crossing, (ii) receive information regarding a type of the brushless direct current motor from the control module, (iii) provide the control module with an indication signal that indicates whether the rotor coils currently experience BEMF zero crossing based on the type of the brushless direct current motor, and
the control module is configured to (i) transmit to the zero crossing detection module the information regarding the type of the brushless direct current motor, and (ii) control the power switching devices of the at least three half-bridge circuits by generating and outputting, based on the indication signal provided by the zero crossing detection module, pulse width modulation signals.

* * * * *

UNITED STATES PATENT AND TRADEMARK OFFICE
CERTIFICATE OF CORRECTION

PATENT NO. : 9,543,867 B2
APPLICATION NO. : 14/970673
DATED : January 10, 2017
INVENTOR(S) : Sun et al.

Page 1 of 1

It is certified that error appears in the above-identified patent and that said Letters Patent is hereby corrected as shown below:

In the Claims

In Column 16, Lines 23-26, Lines 17-20 of Claim 3 should read:
the first detecting circuit is configured to at least one of (i)
    detect, based on a voltage from the first input terminal
    and the first reference voltage, whether the A phase coil
    experiences BEMF zero crossing and output a detecting Signed and Sealed this
Thirtieth Day of May, 2017

Michelle K. Lee
*Director of the United States Patent and Trademark Office*